United States Patent
McVay et al.

(10) Patent No.: US 10,738,213 B2
(45) Date of Patent: Aug. 11, 2020

(54) MODIFIED SILICONE COATING COMPOSITION

(71) Applicant: PPG Industries Ohio, Inc., Cleveland, OH (US)

(72) Inventors: Robert McVay, Cincinnati, OH (US); Christopher Most, Edgewood, KY (US); Alyssa McGhee, Fountain Valley, CA (US); Debra L. Singer, Wexford, PA (US)

(73) Assignee: PPG Industries Ohio, Inc., Celveland, OH (US)

( * ) Notice: Subject to any disclaimer, the term of this patent is extended or adjusted under 35 U.S.C. 154(b) by 218 days.

(21) Appl. No.: 15/785,928

(22) Filed: Oct. 17, 2017

(65) Prior Publication Data
US 2019/0112496 A1    Apr. 18, 2019

(51) Int. Cl.

| | | |
|---|---|---|
| *B65D 25/34* | (2006.01) | |
| *C09D 151/08* | (2006.01) | |
| *C09D 157/10* | (2006.01) | |
| *C09D 5/02* | (2006.01) | |
| *C08F 290/06* | (2006.01) | |
| *C09D 5/08* | (2006.01) | |
| *C08F 283/12* | (2006.01) | |
| *C08G 77/20* | (2006.01) | |
| *C09D 7/65* | (2018.01) | |

(52) U.S. Cl.
CPC ......... *C09D 151/085* (2013.01); *B65D 25/34* (2013.01); *C08F 283/124* (2013.01); *C08F 290/068* (2013.01); *C09D 5/02* (2013.01); *C09D 5/08* (2013.01); *C09D 157/10* (2013.01); *C08G 77/20* (2013.01); *C08L 2312/04* (2013.01); *C09D 7/65* (2018.01)

(58) Field of Classification Search
CPC .......... C08F 283/12; C08F 283/124; C08F 290/068; C09D 151/085; C08G 77/20; C08L 83/04; C08L 51/085; B21D 51/26; B21D 51/2669
USPC ........ 528/31, 32, 33; 428/447, 450; 525/477
See application file for complete search history.

(56) References Cited

U.S. PATENT DOCUMENTS

| | | | |
|---|---|---|---|
| 4,618,653 A * | 10/1986 | Kawakubo | C08F 283/004 525/254 |
| 5,077,354 A | 12/1991 | Woo et al. | |
| 5,248,343 A * | 9/1993 | Hamilton | B01D 17/00 134/10 |
| 5,633,335 A * | 5/1997 | Manzouji | C08F 290/068 525/326.5 |
| 6,646,048 B2 | 11/2003 | Matsuda et al. | |
| 8,124,689 B2 | 2/2012 | Loubert et al. | |
| 8,664,329 B2 | 3/2014 | Liu | |
| 2003/0054112 A1* | 3/2003 | Patzelt | C08K 5/0008 427/427.4 |
| 2006/0069198 A1 | 3/2006 | Okuda et al. | |
| 2008/0076883 A1* | 3/2008 | Takeuchi | C08F 8/42 525/477 |
| 2012/0214928 A1* | 8/2012 | Raman | C09D 5/02 524/431 |
| 2015/0267048 A1* | 9/2015 | Wakita | C08L 27/12 524/504 |
| 2018/0086940 A1 | 3/2018 | Most et al. | |

FOREIGN PATENT DOCUMENTS

| | | | |
|---|---|---|---|
| CN | 105755864 | 7/2016 | |
| CN | 105755864 A * | 7/2016 | |
| WO | WO-2009124229 A1 * | 10/2009 | ............... B65C 3/08 |

* cited by examiner

*Primary Examiner* — Lee E Sanderson
(74) *Attorney, Agent, or Firm* — Diane R. Meyers

(57) ABSTRACT

Coating compositions comprising a reaction product of components comprising a silicone comprising at least one ethylenically unsaturated group and at least one monomer polymerizable with the ethylenically unsaturated group are disclosed as are substrates comprising the same.

19 Claims, No Drawings

MODIFIED SILICONE COATING COMPOSITION

FIELD OF THE INVENTION

The present invention is directed to coating compositions comprising the reaction product of components comprising a silicone comprising at least one ethylenically unsaturated group and at least one monomer polymerizable with the ethylenically unsaturated group. Substrates, including packages, coated at least in part with such a coating are also within the scope of the present invention.

BACKGROUND OF THE INVENTION

The application of various polymeric coatings to metallic substrates, including metal cans such as food, beverage and cosmetic containers, to retard or inhibit corrosion is well established. Coatings are applied to the interior of such containers to prevent the contents from contacting the metal of the container. Contact between the metal and the food, beverage or cosmetic can lead to corrosion of the metal container, which can then contaminate the product. This is particularly true when the contents of the container are acidic in nature, such as tomato-based products and soft drinks.

Certain coatings, particularly in the packaging industry, must undergo extreme stresses in the course of preparation and use of the packaging containers. In addition to flexibility, packaging coatings may also need resistance to chemicals, solvents, and pasteurization processes used in the packaging of beer and other beverages, and may also need to withstand retort conditions commonly employed in food packaging. In addition to corrosion protection, coatings for food and beverage containers should be non-toxic, and should not adversely affect the taste of the food or beverage in the can. Resistance to "popping", "blushing" and/or "blistering" may also be desired.

Bisphenol A ("BPA") contributes to many of the properties desired in packaging coating products. The use of BPA and related products such as bisphenol A diglycidyl ether ("BADGE"), however, has recently come under scrutiny in the packaging industry. Substantially BPA-free coatings having properties comparable to coatings comprising BPA are therefore desired. A reduced use of formaldehyde in coatings is also desired.

SUMMARY OF THE INVENTION

The present invention is directed to a coating composition comprising the reaction product of components comprising a silicone comprising at least one ethylenically unsaturated group and at least one monomer polymerizable with the ethylenically unsaturated group. Articles coated at least in part with such coatings, including metal cans, are also within the present scope.

DETAILED DESCRIPTION OF THE INVENTION

The present invention is directed to a coating composition comprising the reaction product of components comprising a silicone comprising at least one ethylenically unsaturated group and at least one monomer polymerizable with the ethylenically unsaturated group. It will be appreciated that additional components may be incorporated into the reaction product. A "silicone" will be understood as generally referring to a compound having Si—O bonds. A "silicone comprising at least one ethylenically unsaturated group" refers to a silicone having one or more points of unsaturation pendent and/or terminal to the silicone backbone; that is, the compound has one or more C═C bonds. The silicone can be directly attached to the C═C bond, that is Si—C═C, or bonded to other elements in the compound. A silicone comprising an unsaturated group according to the present invention has at least one unsaturated group, but can have two or more, five or more, ten or more and the like. The unsaturation can derive from any compound that can be reacted with the silicone.

An exemplary method for preparing a silicone comprising at least one ethylenically unsaturated group according to the present invention involves reacting an alkyl and/or aryl group containing siloxane with a vinyl containing siloxane. Examples of suitable vinyl containing siloxanes include 2,4,6,8-tetramethyl-2,4,6,8-tetravinylcylcotetrasiloxane, 1,3-divinyltetramethyldisiloxane, and 1,3-divinyltetraphenyldisiloxane. The components used in forming the silicone comprising at least one ethylenically unsaturated group, sometimes referred to herein as the "modified silicone", can be reacted in sufficient amounts to yield the desired molecular weight and vinyl content. The reaction can take place in the presence of a base catalyst such as sodium hydroxide. The resulting resin can be vacuum stripped to >98% non-volatile content to remove residual cyclic structures. For example, if one mole of a polysiloxane having 8 reactive vinyl groups and a Mw of 10,000 was desired, 162 grams of hexamethyldisiloxane, 688 grams of 2,4,6,8-tetramethyl-2,4,6,8-tetravinylcyclotetrasiloxane, and 9176 grams of octamethylcyclotetrasiloxane could be reacted. Silicones comprising at least one ethylenically unsaturated group are also commercially available from SilTech. The weight average molecular weight as measured by GPC using a polystyrene standard ("Mw") of the silicone comprising at least one ethylenically unsaturated group can be 10,000 or greater, such as 15,000 or greater or 20,000 or greater or 40,000 or lower, 35,000 or lower or 30,000 or lower. Any Mw range within these endpoints can be used; a particularly suitable Mw range is 17,000 to 23,000.

The silicone comprising at least one ethylenically unsaturated group is typically in a reaction mixture with at least one monomer polymerizable with the ethylenically unsaturated group, sometimes referred to herein as "polymerizable monomer(s)". Accordingly, at least one of the monomers included in the polymerizable monomers has ethylenic saturation that can react with the ethylenically unsaturated group of the modified silicone. Examples of suitable polymerizable monomers include acrylates and acrylamides, such as ethyl acrylate, methyl (meth)acrylate, methacrylic acid, acrylic acid, methyl acrylate, butyl acrylate, styrene, ethyl (meth) acrylate and n-butoxy methyol acrylamide. Combinations of such monomers can also be used.

The reaction mixture comprising the silicone comprising at least one ethylenically unsaturated group and at least one monomer polymerizable with the ethylenically unsaturated group can be polymerized by any conventional means, such as with a free radical initiator such as t-butyl peroctoate. The silicone moiety becomes polymerized into the reaction product through this reaction. The reaction mixture may comprise 5 wt % or greater silicone comprising at least one ethylenically unsaturated group, such as 10 wt % or greater or 15 wt % or greater, or 20 wt % or lower, such as 15 wt % or lower or 10 wt % or lower. Any wt % range within these parameters can be used, such as 5 to 15 wt %, or 20-1 to 10 wt %. Wt % as used in this context is based on the total solid weight of the reaction mixture. The remainder of the reaction mixture will comprise polymerizable monomer(s).

It will be appreciated that silicone is generally incompatible with acrylics. By choosing polymerizable monomers comprising acrylic and polymerizing the silicone into the acrylic, this incompatibility is addressed. The coating compositions of the present invention may comprise 1.0 wt % or greater, such as 3 wt % or greater or 5 wt % or greater silicone comprising at least one ethylenically unsaturated group.

Alternatively, the silicone comprising at least one ethylenically unsaturated group and polymerizable monomers can form an emulsion polymerized latex. The emulsion polymerized latex of the present invention can be prepared according to methods known in the art. For example, the silicone comprising at least one ethylenically unsaturated group and polymerizable monomers can be emulsified with a polymerizable surfactant in water and the emulsion fed into pre-heated water with an initiator. "Emulsion polymerized latex" and "emulsion polymerized latex polymer" according to the present invention therefore includes a latex prepared by pre-emulsifying the monomers with a polymerizable surfactant. The emulsion polymerized latex can have reactive functionality, such as epoxy, hydroxyl, acid, amine and/or thiol functionality. The latex can be a core-shell latex prepared by using a monomer premix having one functionality and a polymerizable surfactant having a reactive functionality.

The average particle size of the latex particles can be 0.05 micron, or greater such as at 0.08 micron or greater or 0.1 micron or greater, and can be up to 1.0 micron or less, such as 0.5 micron or less or 0.2 micron or less. The average particle size can range, for example, from 0.05 to 1.0 micron, such as 0.1 to 0.5 micron, 0.1 to 0.2 micron, or 0.08 to 0.2 micron. The weight average molecular weight of these particles as measured by gel-permeation chromatography in tetrahydrofuran can be, for example, 50,000 or greater, such as 100,000 or greater or 400,000 or greater, and can be 1,000,000 or less, such as 800,000 or less or 650,000 or less. The weight average molecular weight of these particles can range for example, from 50,000 to 1,000,000, such as 100,000 to 800,000 or 400,000 to 650,000. Higher weight average molecular weight may increase flexibility and/or resistance of the film coating. Any values within these broad ranges are also within the scope of the present invention, as are higher or lower numbers. Theoretical Tg values for the latex can be as low as −20° C. or greater, such as 5° C. or greater or 25° C. or greater and as high as 100° C. or lower, such as 80° C. or lower or 40° C. or lower. The Tg can range, for example, from −20° C. to 100° C., such as 25° C. to 80° C. or 5° C. to 40° C.

The coatings used according to the present invention can comprise, for example, 10 wt % of the latex or greater, such as 20 wt % or greater or 50 wt % or greater, and as much as 100 wt % or less, such as 95 wt % or less or 90 wt % or less; the amount of latex can range, for example, from 10 to 100 wt %, such as 20 to 95 wt %, with weight percent based on the total solid weight of the coating.

The latex may function as the film forming resin in the coating. Such coatings may further comprise a crosslinker. Suitable crosslinkers include benzoguanamine, phenolics and melamine aminoplasts, all of which are widely commercially available from S.I. or Cytec.

The coating compositions of the present invention may further comprise an additional film forming component. A film forming component may include, for example, a film forming resin and a crosslinker therefor. Any film forming resin can be used according to the present invention. The film-forming resin can comprise, for example, an acrylic polymer, a polyester polymer, a polyurethane polymer, a polyamide polymer, a polyether polymer, a polysiloxane polymer, copolymers thereof, and mixtures thereof. Generally, these polymers can be any polymers of these types made by any method known to those skilled in the art. Such polymers may be solvent-borne or water-dispersible, emulsifiable, or of limited water solubility. The film forming resin will typically have functional groups including, for example, carboxylic acid groups, amine groups, epoxide groups, hydroxyl groups, thiol groups, carbamate groups, amide groups, urea groups, isocyanate groups (including blocked isocyanate groups), mercaptan groups, silanol groups, alkoxy groups and combinations thereof. Appropriate mixtures of film-forming resins may also be used in the preparation of the present compositions. The film forming component may also comprise a crosslinker having functional groups reactive with the functional groups on the resin. One skilled in the art can select an appropriate crosslinker based on this functionality from crosslinkers such as melamine, phenolic, carbodiimide, hydroxyalkylamide, hydroxyalkyurea, isocyanate, blocked isocyanate, benzoguanamine, TGIC, epoxies, oxazolines, organosilanes, and the like. The film forming resin may also be self-crosslinking; that is, the resin will react with itself to cure. Examples of such resins include, polysiloxane resins that contain silanol (Si—OH), alkoxy groups (Si—O—R), or acetoxy groups (Si—O—COCH$_3$), which can condense or become reactive due to the presence of moisture and heat to self-condense.

A particularly suitable film forming resin is an acrylic resin. The acrylic resin, for example, may be formed by using any number of acrylic monomers, including styrene, alkyl (meth)acrylates such as ethyl (meth)acrylate, methyl (meth)acrylate, and butyl (meth)acrylate, functional acrylates such as hydroxyethyl (meth)acrylate, and acrylamides such as n-butoxy methyl acrylamide. For example, an acid functional (meth)acrylic acid and an alkyl (meth)acrylate may each be used. Mixtures of (meth)acrylic resins can also be used. It will be understood that (meth)acrylic and like terms refers to both methacrylic and acrylic. According to the present invention, the acrylic resin may exclude or be substantially free of hydroxyl functional acrylic monomers, styrene and/or vinyl chloride monomers; in this context "substantially free" means these monomers are not intentionally used in the polymerization of the acrylic and are therefore present, if at all, in an amount of 1 wt % or less, based on total wt % of the monomers. The acrylic resin may exclude ethyl acrylate and/or acrylamide, such as n-butoxy methyl acrylamide. In addition, when using an acrylic resin in the present compositions, the (meth)acrylic resin may be substantially free of unreacted unsaturation. That is, reaction of the (meth)acrylic monomers in the formation of the (meth)acrylic resin will consume the unsaturation. Thus, the (meth)acrylic resins used according to the present invention are not radiation curable, and any residual unsaturation that might remain in the (meth)acrylic resin upon reaction of the monomers is not enough to render the (meth)acrylic resin radiation curable.

The composition can comprise, for example, 10 wt % or greater of film forming component, such as 25 wt % or greater or 50 wt % or greater and/or can comprise 95 wt % or lower of film forming component, such as 80 wt % or lower or 60 wt % or lower, with weight percent based on total solid weight of the coating composition. Any wt % ranges within these parameters can be used. A wt % of 70 to 95 may be particularly suitable, wherein this weight percent reflects the solids weight of any film forming resin tougher with any crosslinker.

The coating composition may comprise one or more solvents including water or organic solvents. Suitable organic solvents include glycols, glycol ether alcohols, alcohols, ketones, and aromatics, such as xylene and toluene, acetates, mineral spirits, naphthas and/or mixtures thereof. "Acetates" include the glycol ether acetates. The solvent can be a non-aqueous solvent. "Non-aqueous solvent" and like terms means that less than 50% of the solvent is water. For example, less than 10%, or even less than 5% or 2%, of the solvent can be water. It will be understood that mixtures of solvents, including or excluding water in an amount of less than 50%, can constitute a "non-aqueous solvent". The composition may be aqueous or water-based. This means that 50% or more of the solvent is water. These embodiments have less than 50%, such as less than 20%, less than 10%, less than 5% or less than 2% solvent.

The composition may be in solid particulate form, i.e. a powder coating. Such coatings will be appreciated as being environmentally friendly, as only water is released on cure.

If desired, the compositions can comprise other optional materials well known in the art of formulating, such as colorants, plasticizers, abrasion resistant particles, anti-oxidants, hindered amine light stabilizers, UV light absorbers and stabilizers, surfactants, flow control agents, thixotropic agents, fillers, organic cosolvents, reactive diluents, catalysts, grind vehicles, slip agents, moisture scavenger and other customary auxiliaries.

As used herein, the term "colorant" means any substance that imparts color and/or other opacity and/or other visual effect, e.g. gloss, to the composition. The colorant can be added to the coating in any suitable form, such as discrete particles, dispersions, solutions and/or flakes. A single colorant or a mixture of two or more colorants can be used in the coatings of the present invention. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; chromium oxides, such as graphite fibrils; ferried yellow; quindo red; and combinations thereof, and those listed in Article 178.3297 of the Code of Federal Regulations, which is incorporated by reference herein.

Example colorants include matting pigments, dyes and tints, such as those used in the paint industry and/or listed in the Dry Color Manufacturers Association (DCMA), as well as special effect compositions. A colorant may include, for example, a finely divided solid powder that is insoluble but wettable under the conditions of use. A colorant can be organic or inorganic and can be agglomerated or non-agglomerated. Colorants can be incorporated into the coatings by grinding or simple mixing. Colorants can be incorporated by grinding into the coating by use of a grind vehicle, such as an acrylic grind vehicle, the use of which will be familiar to one skilled in the art.

Example pigments and/or pigment compositions include, but are not limited to, carbazole dioxazine crude pigment, azo, monoazo, disazo, naphthol AS, salt type (lakes), benzimidazolone, condensation, metal complex, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, carbon fiber, graphite, other conductive pigments and/or fillers and mixtures thereof. The terms "pigment" and "colored filler" can be used interchangeably.

Example dyes include, but are not limited to, those that are solvent and/or aqueous based such as acid dyes, azoic dyes, basic dyes, direct dyes, disperse dyes, reactive dyes, solvent dyes, sulfur dyes, mordant dyes, for example, bismuth vanadate, anthraquinone, perylene aluminum, quinacridone, thiazole, thiazine, azo, indigoid, nitro, nitroso, oxazine, phthalocyanine, quinoline, stilbene, and triphenyl methane.

Example tints include, but are not limited to, pigments dispersed in water-based or water-miscible carriers such as AQUA-CHEM 896 commercially available from Degussa, Inc., CHARISMA COLORANTS and MAXITONER INDUSTRIAL COLORANTS commercially available from Accurate Dispersions division of Eastman Chemicals, Inc.

As noted above, the colorant can be in the form of a dispersion including, but not limited to, a nanoparticle dispersion. Nanoparticle dispersions can include one or more highly dispersed nanoparticle colorants and/or colorant particles that produce a desired visible color and/or opacity and/or visual effect. Nanoparticle dispersions can include colorants such as pigments or dyes having a particle size of less than 150 nm, such as less than 70 nm, or less than 30 nm. Nanoparticles can be produced by milling stock organic or inorganic pigments with grinding media having a particle size of less than 0.5 mm. Example nanoparticle dispersions and methods for making them are identified in U.S. Pat. No. 6,875,800 B2, which is incorporated herein by reference. Nanoparticle dispersions can also be produced by crystallization, precipitation, gas phase condensation, and chemical attrition (i.e., partial dissolution). In order to minimize re-agglomeration of nanoparticles within the coating, a dispersion of resin-coated nanoparticles can be used. As used herein, a "dispersion of resin-coated nanoparticles" refers to a continuous phase in which is dispersed discreet "composite microparticles" that comprise a nanoparticle and a resin coating on the nanoparticle. Example dispersions of resin-coated nanoparticles and methods for making them are described, for example, in U.S. Pat. No. 7,605,194 at column 3, line 56 to column 16, line 25, the cited portion of which being incorporated herein by reference.

Example special effect compositions that may be used include pigments and/or compositions that produce one or more appearance effects such as reflectance, pearlescence, metallic sheen, phosphorescence, fluorescence, photochromism, photosensitivity, thermochromism, goniochromism and/or color-change. Additional special effect compositions can provide other perceptible properties, such as opacity or texture. For example, special effect compositions can produce a color shift, such that the color of the coating changes when the coating is viewed at different angles. Example color effect compositions are identified in U.S. Pat. No. 6,894,086, incorporated herein by reference. Additional color effect compositions can include transparent coated mica and/or synthetic mica, coated silica, coated alumina, a transparent liquid crystal pigment, a liquid crystal coating, and/or any composition wherein interference results from a refractive index differential within the material and not because of the refractive index differential between the surface of the material and the air.

A photosensitive composition and/or photochromic composition, which reversibly alters its color when exposed to one or more light sources, can be used in the coating of the present invention. Photochromic and/or photosensitive compositions can be activated by exposure to radiation of a specified wavelength. When the composition becomes excited, the molecular structure is changed and the altered structure exhibits a new color that is different from the original color of the composition. When the exposure to radiation is removed, the photochromic and/or photosensitive composition can return to a state of rest, in which the original color of the composition returns. For example, the photochromic and/or photosensitive composition can be colorless in a non-excited state and exhibit a color in an excited state. Full color-change can appear within milliseconds to several minutes, such as from 20 seconds to 60 seconds. Example photochromic and/or photosensitive compositions include photochromic dyes.

The photosensitive composition and/or photochromic composition can be associated with and/or at least partially bound to, such as by covalent bonding, a polymer and/or polymeric materials of a polymerizable component. In contrast to some coatings in which the photosensitive composition may migrate out of the coating and crystallize into the substrate, the photosensitive composition and/or photochromic composition associated with and/or at least partially bound to a polymer and/or polymerizable component in accordance with the present invention, have minimal migration out of the coating. Example photosensitive compositions and/or photochromic compositions and methods for making them are identified in U.S. Pat. No. 8,153,344, and incorporated herein by reference.

In general, the colorant can be present in any amount sufficient to impart the desired visual and/or color effect. The colorant may comprise from 1 to 65 weight percent of the present compositions, such as from 3 to 40 weight percent or 5 to 35 weight percent, with weight percent based on the total weight of the compositions.

An "abrasion resistant particle" is one that, when used in a coating, will impart some level of abrasion resistance to the coating as compared with the same coating lacking the particles. Suitable abrasion resistant particles include organic and/or inorganic particles. Examples of suitable organic particles include but are not limited to diamond particles, such as diamond dust particles, and particles formed from carbide materials; examples of carbide particles include but are not limited to titanium carbide, silicon carbide and boron carbide. Examples of suitable inorganic particles, include but are not limited to silica; alumina; alumina silicate; silica alumina; alkali aluminosilicate; borosilicate glass; nitrides including boron nitride and silicon nitride; oxides including titanium dioxide and zinc oxide; quartz; nepheline syenite; zircon such as in the form of zirconium oxide; buddeluyite; and eudialyte. Particles of any size can be used, as can mixtures of different particles and/or different sized particles. For example, the particles can be microparticles, having an average particle size of 0.1 to 50, 0.1 to 20, 1 to 12, 1 to 10, or 3 to 6 microns, or any combination within any of these ranges. The particles can be nanoparticles, having an average particle size of less than 0.1 micron, such as 0.8 to 500, 10 to 100, or 100 to 500 nanometers, or any combination within these ranges.

Any slip agent can be used according to the present invention such as those commercial available from BYK Chemie or Dow Corning. A wax can also be used such as polyolefin wax, silicone or paraffin.

The coating compositions of the present invention may be substantially free, may be essentially free and/or may be completely free of bisphenol A and epoxy compounds derived from bisphenol A ("BPA"), such as bisphenol A diglycidyl ether ("BADGE"). Such compounds are sometimes referred to as "BPA non intent" because BPA, including derivatives or residues thereof, are not intentionally added but may be present in trace amounts because of impurities or unavoidable contamination from the environment. The coating compositions can also be substantially free and may be essentially free and/or may be completely free of bisphenol F and epoxy compounds derived from bisphenol F, such as bisphenol F diglycidyl ether ("BFDGE"). The term "substantially free" as used in this context means the coating compositions contain less than 1000 parts per million (ppm), "essentially free" means less than 100 ppm and "completely free" means less than 20 parts per billion (ppb) of any of the above mentioned compounds, derivatives or residues thereof.

The present compositions can be applied to any substrates known in the art, for example, automotive substrates, aerospace substrates, marine substrates, industrial substrates, packaging substrates, wood flooring and furniture, apparel, electronics including housings and circuit boards and including consumer electronics such as housings for computers, notebooks, smartphones, tablets, televisions, gaming equipment, computer equipment, computer accessories, MP3 players, and the like, glass and transparencies, sports equipment including golf balls, and the like. Accordingly, the present invention is further directed to a substrate coated at least in part with any of the coating compositions described above. These substrates can be, for example, metallic or non-metallic. Metallic substrates include tin, steel, tin-plated steel, chromium passivated steel, galvanized steel, aluminum, aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like. The substrate can be one that has been already treated in some manner, such as to impart visual and/or color effect. Suitable substrates can include those in which powder coatings are typically applied.

The compositions of the present invention can be applied by any means standard in the art, such as electrocoating, spraying, electrostatic spraying, dipping, rolling, brushing, and the like.

The compositions can be applied to a dry film thickness of 0.04 mils to 4 mils, such as 0.3 to 2 or 0.7 to 1.3 mils. The compositions can also be applied to a dry film thickness of 0.1 mils or greater, 0.5 mils or greater 1.0 mils or greater, 2.0 mils or greater, 5.0 mils or greater, or even thicker. In some applications, a dry film thickness of 1-20 microns, such as 2-6 microns, is desired.

The compositions of the present invention can be used alone, or in combination with one or more other compositions, such as a coating system having two or more layers. For example, the compositions of the present invention can comprise a colorant or not and can be used as a primer, basecoat, and/or top coat. For substrates coated with multiple coatings, one or more of those coatings can be coatings as described herein. The present coatings can also be used as a packaging "size" coating, wash coat, spray coat, end coat, and the like.

It will be appreciated that the compositions described herein can be either one component ("1K"), or multi-component compositions such as two component ("2K") or more. A 1K composition will be understood as referring to a composition wherein all the coating components are maintained in the same container after manufacture, during storage, etc. A 1K composition can be applied to a substrate and cured by any conventional means, such as by heating, forced air, and the like. The present compositions can also be multi-component, which will be understood as compositions in which various components are maintained separately until just prior to application. As noted above, the present compositions can be thermoplastic or thermosetting.

The composition can be a clearcoat. A clearcoat will be understood as a coating that is substantially transparent or translucent. A clearcoat can therefore have some degree of color, provided it does not make the clearcoat opaque or otherwise affect, to any significant degree, the ability to see the underlying substrate. The clearcoats of the present invention can be used, for example, in conjunction with a pigmented basecoat. The clearcoat can be formulated as is known in the coatings art.

The composition may also comprise a colorant, such as a pigmented basecoat used in conjunction with a clearcoat, or as a pigmented monocoat. Such coating layers are used in various industries to impart a decorative and/or protective finish. For example, such a coating or coating system may be applied to a vehicle. "Vehicle" is used herein in its broadest sense and includes all types of vehicles, such as but not limited to cars, trucks, buses, vans, golf carts, motorcycles, bicycles, railroad cars, airplanes, helicopters, spacecraft and the like. It will be appreciated that the portion of the vehicle that is coated according to the present invention may vary depending on why the coating is being used. For example, anti-chip primers may be applied to some of the portions of the vehicle as described above. When used as a colored basecoat or monocoat, the present coatings will typically be applied to those portions of the vehicle that are visible such as the roof, hood, doors trunk lid and the like, but may also be applied to other areas such as inside the trunk, inside the door and the like especially when the compositions are formulated as sealants or adhesives; they can also be applied to those portions of the car that are in contact with the driver and/or passengers, such as the steering wheel, dashboard, gear shift, controls, door handle and the like. Clearcoats will typically be applied to the exterior of a vehicle.

The compositions of the present invention are also suitable for use as packaging coatings. The application of various pretreatments and coatings to packaging is well established. Such treatments and/or coatings, for example, can be used in the case of metal cans, wherein the treatment and/or coating is used to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements should also be resistant to popping, corrosion, blushing and/or blistering.

Accordingly, the present invention is further directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. "Beverage can" may also be used to refer more specifically to a food can in which a beverage is packaged. The term "metal can(s)" specifically includes food cans, including beverage cans, and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two piece cans" and "three-piece cans" as well as drawn and ironed one-piece cans; such one piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. The coating is applied to a coil or sheet by roll coating; the coating is then cured by radiation and can ends are stamped out and fabricated into the finished product, i.e. can ends. The coating could also be applied as a rim coat to the bottom of the can; such application can be by roll coating. The rim coat functions to reduce friction for improved handling during the continued fabrication and/or processing of the can. The coating can also be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans.

Metal coils, having wide application in many industries, are also substrates that can be coated according to the present invention. Coil coatings also typically comprise a colorant.

After application to the substrate, the coating composition may be cured by any appropriate means. In some applications a cure of 435° F. or lower, such as 415° F. or lower or 390° F. or lower for 12 minutes or less, such as 5 minutes or less may be desired and can be achieved according to the present invention. In other applications a cure of 500° F. or lower, such as 450° F. or lower or 400° F. or lower but for a time of 25 seconds or less, such as 20 seconds or less, or 15 seconds or less, may be desired and can be achieved according to the present invention. Accordingly, the present coatings can be used across a broad range of industries and cure conditions.

As used herein, unless otherwise expressly specified, all numbers such as those expressing values, ranges, amounts or percentages may be read as if prefaced by the word "about", even if the term does not expressly appear. Also, any numerical range recited herein is intended to include all sub-ranges subsumed therein. Singular encompasses plural and vice versa. For example, although reference is made herein to "a" silicone comprising at least one ethylenically unsaturated group, "a" polymerizable monomer, "a" film forming resin, "a" crosslinker and the like, one or more of each of these and any other components can be used. As used herein, the term "polymer" refers to oligomers and both homopolymers and copolymers, and the prefix "poly" refers to two or more. (Meth)acrylic, and like terms, refers to both acrylic and methacrylic. Including, for example, and like terms means including, for example, but not limited to. When ranges are given, any endpoints of those ranges and/or numbers within those ranges can be combined within the scope of the present invention. When maximum and minimum amounts are given, any such amounts can be combined to specify ranges of ingredients; any numbers within those ranges can be combined within the scope of the present invention. The word "comprising" and forms of the word "comprising", as used in this description and in the claims, does not limit the present invention to exclude any variants or additions. Additionally, although the present invention has been described in terms of "comprising", the processes, materials, and coating compositions detailed herein may also be described as "consisting essentially of" or "consisting of".

Non-limiting aspects of the invention include:

1. A coating comprising the reaction product of a reaction mixture comprising a silicone comprising at least one ethylenically unsaturated group and at least one monomer polymerizable with the ethylenically unsaturated group.

2. The coating composition of Aspect 1, wherein the silicone comprising at least one ethylenically unsaturated group is prepared by reacting divinyltetramethydisiloxane with octamethylcyclotetrasiloxane optimally in the presence of a base coating such as a sodium hydroxide catalyst.

3. The coating composition of any of the preceding Aspects, wherein the monomer polymerizable with the ethylenically unsaturated group comprises ethyl acrylate, methyl methacrylate, styrene, methyl acrylate, ethyl methacrylate, methacrylic acid, acrylic acid, butyl acrylate and/or n-butoxy methyol acrylamide.

4. The coating of any of the preceding Aspects, wherein the reaction mixture comprises 5 to 20 wt % silicone comprising at least one ethylenically unsaturated group and 80 to 95 wt % monomer polymerizable with the ethylenically unsaturated group.

5. The coating composition of any of the preceding Aspects, wherein the silicone comprises a silanol functional silsesquioxane silicone resin.

6. The coating composition of any of the preceding Aspects, further comprising an acrylic resin.

7. The coating composition of Aspect 6, wherein the acrylic resin comprises structural units derived from (meth)acrylic acid and/or alkyl (meth)acrylate.

8. The coating composition of any of the preceding Aspects, further comprising phenolic.

9. The coating composition of any of the preceding Aspects, wherein the silicone comprising at least one ethylenically unsaturated group and the at least one monomer polymerizable with the ethylenically unsaturated group form latex particles.

10. A substrate coated at least in part with the coating composition any of the preceding Aspects.

11. The substrate of Aspect 10, wherein the substrate comprises a package.

12. The package of Aspect 11, wherein the package is a metal can.

13. The package of Aspect 12, wherein the metal can is a food or beverage can.

14. The package of Aspect 13, wherein the food or beverage can is coated on the inside with the coating composition of any Aspects 1-9.

EXAMPLES

The following examples are intended to illustrate the invention and should not be construed as limiting the invention in any way.

Example 1

A silicone comprising at least one ethylenically unsaturated group, specifically a di-vinyl silicone polymer having an Mw as measure by GPC using a polystyrene standard of 20,000, was made by charging the following components to a glass 3 L round bottom flask equipped with thermowatch, heating mantle, reflux condenser, stainless steel stirring shaft with stainless steel stirring blade and nitrogen blanket:

Divinyltetramethyldisiloxane 12.97 grams
Octamethylcyclotetrasiloxane from ShinEtsu 1487.03 grams
NaOH −0.5 grams The flask was stirred and heated to 90° C. and held for eight hours for the polymer to reach equilibrium at which time acetic acid was added to neutralize the NaOH. The temperature was increased to 200° C. and held for an additional four hours. The product was vacuum stripped at 150° C. for an additional four hours to remove any remaining cyclical siloxanes.

Example 2

The silicon prepared according to Example 1 was reacted with polymerizable monomers as follows:

| Charge | Ingredients | Amount in grams |
|---|---|---|
| Charge 1 | Butyl cellosolve | 838 |
| | isopropanol | 72 |
| Charge 2 | n-butoxy methyol acrylamide | 88.6 |
| | styrene | 532 |
| | methacrylic acid | 334 |
| | ethyl acrylate | 665 |
| | divinyl silicone prepared according to Example 1 | 359 |
| Charge 3 | Butyl cellosolve | 118 |
| | T-butyl peroxyacetate | 44 |
| Charge 4 | Butyl cellosolve | 25 |
| | T-butyl peroxyacetate | 5 |
| Charge 5 | Butyl cellosolve | 50 |
| | T-butyl peroxyacetate | 5 |
| Charge 6 | Butyl cellosolve | 568 |
| | | 3703 |

Charge 1 was added to a 5 L round bottom flask and heated to 133-137° C. reflux. Charges 2 and 3 were added simultaneously to the flask over 3 hours, while maintaining reflux. After a 3 hour hold, charge 4 was added and held for 15 minutes; then charge 5 was added and held one hour at reflux. Charge 6 was added to the cooled batch. The resulting polymer was 53.4% resin solids and had an acid number of 110 based on solids, and contained 18.15% vinyl modified silicone on resin solids.

Example 3

Two piece interior spray coatings according to the present invention were made using the ingredients shown below:

| Component | Amount in grams | Resin solids in grams | % resin solids |
|---|---|---|---|
| Coating A | | | |
| Silicone acrylic polymer from Example 2 | 185 | 94 | 10.3 |
| Phenolic A[1] | 1200 | 600 | 65.4 |
| EPIKURE 3115[2] 80% solids in butanol | 60 | 48 | 5.2 |
| Butanol | 44 | — | — |
| Acrylic A | 500 | 175 | 19.1 |
| DI water | 894 | — | — |
| Oleic acid | 10 | — | — |
| Caprylic acid | 10 | — | — |
| Butanol | 90 | — | — |
| DI water | 452 | — | — |
| | 3445 | 917 | 100 |
| Coating B | | | |
| Silicone acrylic polymer from Example 2 | 185 | 94 | 9.8 |
| Phenolic A | 600 | 300 | 31.1 |
| Phenolic B[3] | 500 | 300 | 31.1 |
| EPIKURE 3115 80% solids in butanol | 120 | 96 | 9.9 |
| Butanol | 44 | — | — |
| Acrylic A 35% solids in water | 500 | 175 | 18.1 |
| DI water | 894 | — | — |
| Oleic acid | 10 | — | — |
| Caprylic acid | 10 | — | — |
| Butanol | 90 | — | — |
| DI water | 452 | — | — |
| | 3405 | 965 | 100 |

| Acrylic A | Resin solids |
|---|---|
| Styrene | 20% |
| Methacrylic acid | 30% |
| Ethyl acrylate | 50% |
| | 100% |

[1]Phenolic A = PR516 from Allnex
[2]EPICURE 3115 = amine terminated polyamide from Hexion
[3]Phenolic B = HRJ1367 from SI Group For both coatings, the silicon acrylic polymer and phenolic were heated to 140° F. to 150° F. using a high speed cowls mixer. The EPIKURE and butanol were added and held at one hour. Acrylic A was added, the mixture reheated to 140° F. to 150° F. and held for three hours. After three hours DI water and the other components were added. Example A was reduced in viscosity to 21 seconds #4 Ford, which resulted in a solids of 26.5%; Example B was reduced in viscosity to 21 seconds #4 Ford, which resulted in a solids of 28.3%.

Example 4

Coatings A and B were airless spray applied onto 300×407 can to a film weight of 280-300 MGS with a Sprimag commercial spray machine using Nordson MEG guns with the following dwell times and spray nozzles.

Spray Parameters

| | Dwell Time in Milliseconds | Nozzle Type | Pressure |
|---|---|---|---|
| Gun #1 | 108 MS | 1097007 | 750 psi |
| Gun #2 | 100 Ms | 121999 | 800 psi |

The sprayed cans were cured in an inside bake oven at 425° F. for 5 minutes and put into test pack. For the test pack, commercially available Chicken Noodle Soup was heated to 160° F. then put into the sprayed and cured 300×407 cans with a 3/16 in headspace. An end was seamed on the cans. The cans were then steam processed at 250° F. for one hour. After processing, the cans were then cooled to room temperature overnight and finally stored at 120° F. for one or two weeks. Following either one or two weeks, as indicated below, corrosion was rated visually on a scale of 1-10 with 10 being no corrosion. A rating of 8.0 or higher in the top 1 inch of the can is generally considered acceptable.

The top of a DWI can is more prone to corrosion because of the reduced level of tin compared to the bottom of the can due to the drawing process.

The results obtained are shown below.

| Test Pack Results - | | | |
|---|---|---|---|
| Corrosion top ¼ in of 300 × 407 can | Corrosion top 1 inch of can | Corrosion top ¼ in of 300 × 407 can | Corrosion top 1 inch of can |
| Coating A | | Coating B | |
| 1 Week at 120° F. | 1 Week at 120° F. | 1 Week at 120° F. | 1 Week at 120° F. |
| Can1  7.3 | 8.4 | 6.5 | 8.2 |
| Can2  7.8 | 9.2 | 7.7 | 9.1 |
| Can3  7.0 | 9.1 | 7.0 | 9.1 |
| 2 Weeks at 120° F. | 2 Weeks at 120° F. | 2 Weeks at 120° F. | 2 Weeks at 120° F. |
| Can1  7.2 | 8.2 | 7.2 | 8.1 |
| Can2  7.1 | 8.0 | 7.1 | 8.0 |
| Can3  7.0 | 8.1 | 7.0 | 8.1 |

Example 5

A latex was made with vinyl PDMS as follows: A total of 14 grams of MAXEMUL 6106 was added to an Erlenmeyer flask with 421 grams of deionized water and stirred well. A total of 98 grams of glycidyl methacrylate, 346 grams of methyl methacrylate, 644 grams of ethyl acrylate, 22 grams of methacrylic acid and 2.2 grams of the divinyl silicone described in Example 1 were added in order to the Erlenmeyer while mixing well. It was mixed until the monomer emulsion showed no separation upon standing. This is referred to below as the monomer premix.

A total of 1423 grams of deionized water was placed into a 5-liter, 4-neck round bottom flask equipped with a stirrer, water-cooled reflux condenser, two addition funnels and a thermocouple. The water was heated to 80° C. with stirring and under a nitrogen gas blanket. A total of 15 grams of the monomer premix was added to the reactor over 2 minutes. A total of 0.5 grams of ammonium persulfate dissolved in 5 grams of water was then added over 1 minute to the reactor.

The remaining 1554 grams of the monomer premix and 4.4 grams of ammonium persulfate dissolved in 419 grams of water were added in two separate simultaneous feeds to the flask over 150 minutes. At the end of the monomer/initiator feed the reaction was maintained at 80° C. for an additional 60 minutes. An aliquot of 4.4 grams of t-butyl peroctoate thinned with 22 grams of Dowanol PM were added over 5 minutes as a chase initiator to the reactor.

The reaction was held with stirring for an additional 60 minutes at 80° C. It was then allowed to cool to <40° C. A total of 20 grams of dimethylethanolamine in 61 grams of water was added over about 5 minutes. The contents of the flask were filtered and filled out into a suitable container. The final resin had a measured solids of 33%, a surface weighted mean particle size of 117 nm, a Brookfield Viscosity of 12 centipoise (#4@60 rpm) and a bluish-white appearance.

Example 6

A coating was prepared with the latex of Example 5 and tested as indicated below. A total of 40 g of the latex from Example 5 was placed into an appropriately sized container. To the container was added enough deionized water to bring the final solids to 32%. The mixture was agitated using an overhead air supplied stirrer attached with a paddle blade. While the mixture was under agitation, 10% on resin solids of ethylene glycol mono-2-ethylhexyl ether (purchased from Eastman as Ektasolve EEH) was added and allowed to incorporate. After the addition of the Ektasolve EEH, 7.5% on resin solids of the phenolic crosslinker HRJ-13078 (purchased from the SI Group) was added and held under agitation until the resulting mixture became homogenous.

The coating formulation was drawn down on 0.0082" aluminum substrate and baked for 10 seconds in a conveyor oven. The oven temperature was set so that the substrate obtained a Peak Metal Temperature of 450° F. (232° C.). The final film had a Dry Coating Weight of 6.5-7.5 mg/square inch when measured using a Strand gauge.

The final film was measured for blush, adhesion, blister resistance, flexibility as measured by wedge bends, and solvent resistance to Methyl Ethyl Ketone. The results are reported in the table below. As can be seen in the table, the coating prepared according to the present invention had acceptable performance.

| Coating | MEK DR | Wedge Bend | Acetic Acid | | | Dowfax | | | Joy | | | Water Retort | | |
|---|---|---|---|---|---|---|---|---|---|---|---|---|---|---|
| | | | Blush | Adhesion | Blister | Blush | Adhesion | Blister | Blush | Adhesion | Blister | Blush | Adhesion | Blister |
| Example 6 | 22 | 24 | 8 | P | P | 9 | P | P | 9 | P | 9 | P | P | |

Testing Methods

MEK Double Rubs determined the solvent resistance by measuring the number of double rubs by hand it took to soften and break through the coating with a rag saturated with Methyl Ethyl Ketone.

The "Acetic Acid" test measured the resistance of a coating to a boiling 3% acetic acid solution. The solution was prepared by mixing 48 grams of Glacial Acetic Acid (product of Fisher Scientific) into 1552 grams of deionized water. Coated strips were partially immersed into the boiling Acetic Acid solution for 30 minutes. The strips were then rinsed and cooled in deionized water, dried, and immediately rated for blister, blush and adhesion as described below.

The "Dowfax" test measured the resistance of a coating to a boiling detergent solution. The solution was prepared by mixing 2.8 grams of DOWFAX 2A1 (product of Dow Chemical) into 1597.2 grams of deionized water. Coated strips were immersed into the boiling Dowfax solution for 10 minutes. The strips were then rinsed and cooled in deionized water, dried, and immediately rated for blister, blush, and adhesion as described below.

The "Joy" test measured the resistance of a coating to a hot 180° F. (82° C.) Joy detergent solution. The solution was prepared by mixing 16 grams of Ultra Joy Dishwashing Liquid (product of Procter & Gamble) into 1584 grams of deionized water. Coated strips were immersed into the 180° F. (82° C.) Joy solution for 10 minutes. The strips were then rinsed and cooled in deionized water, dried, and immediately rated for blister, blush, and adhesion as described below.

The "Water Retort" test measured the resistance of a coating to pressurized deionized water. Coated strips of substrate were placed into a wide-mouth quart size mason jar. The strips were then partially immersed using Deionized Water. The top of the Mason jar was sealed using a piece of heavy duty aluminum foil. The jar was then placed into a table top autoclave, Tuttnauer EZ-11 Plus. The appropriate program was chosen and started that allowed the autoclave chamber to reach a temperature of 250° F., which was maintained for 30 minutes. After the program finished, the strips were then rinsed and cooled in deionized water, dried, and immediately rated for blister, blush and adhesion as described below.

Blister resistance is a Pass/Fail test. Each panel was visually inspected for the presence of blistering. Blistering was evidenced by the formation of bubbles in the coating during the various soak tests. A Pass rating ("P") was given if there was no detectable blistering of the coating.

Blush resistance measured the ability of a coating to resist attack by various testing solutions. When the coated film absorbed test solution, it generally becomes cloudy or looks white. Blush is measured visually using a scale of 1-10 where a rating of "10" indicated no blush and a rating of "0" indicated complete whitening of the film. Blush ratings of at least 7 are typically desired for commercially viable coatings. The coated panel tested was 2×4 inches (5×10 cm) and the testing solution covered half of the panel being tested. Blush of the exposed panel to the unexposed portion was compared.

Immediately after measuring the Blush resistance, the adhesion of the coated panels was checked using ASTM D3359 Method B "Standard Test Methods for Measuring Adhesion by Tape Test". The adhesive tape used was Scotch Packaging Tape 610. The crosshatch pattern of cuts was made over the liquid/air interface on the coated panel. The results were recorded as Pass/Fail. Any amount of coating removal by the adhesive tape was considered as a Fail.

The panels for the Wedge Bend test were made using a BYK-Gardner "Coverall" Bend and Impact Tester. A 2×4 inch (5×10 cm) coated test panel was first bent double over the 1/8" rod so that the coated surface was on the outside. The bent panel was placed between the parts of the hinge. The impact tool, flat face down, was dropped from a height needed to deliver 40 inch-pounds of impact force onto the upper part of the hinge. The impacted test panel had a wedge shape where one end of the coated metal impinged upon itself and a 1/4 inch space remained on the opposite end.

After completing the wedge bend, the panels were submerged in a copper sulfate solution (70% water, 20% copper sulfate, 10% hydrochloric acid) for 15 seconds. The panels were then removed from the solution, rinsed with deionized water, dried, and immediately rated. The copper sulfate solution etched any area of the panel where the coating cracked and failed. The etched wedge bent panels were then examined through a microscope at 20× power to determine how far from the impinged end along the bent radii the coating cracked. Wedge Bend results were reported as the percentage of cracked area versus total length of the wedge bent panel. Generally lower numbers are more desirable.

Whereas particular embodiments of this invention have been described above for purposes of illustration, it will be evident to those skilled in the art that numerous variations of the details of the present invention may be made without departing from the invention as defined in the appended claims.

What is claimed is:

1. A coating composition comprising the reaction product of components comprising a silicone comprising at least one ethylenically unsaturated group and at least one monomer polymerizable with the ethylenically unsaturated group, wherein the silicone comprising at least one ethylenically unsaturated group comprises 1.0 to 5.0 wt % of the total solid weight of the coating composition and has a weight average molecular weight of 10,000 or greater as measured by gel-permeation chromatography using a polystyrene standard, wherein the silicone comprises a vinyl terminated silicone polymer made by reacting divinyltetramethyldisiloxane with octamethylcyclotetrasiloxane in the presence of a base catalyst.

2. The coating composition of claim 1, wherein the at least one polymerizable monomer comprises an acrylic monomer.

3. The coating composition of claim 2, wherein the at least one polymerizable monomer comprises n-butoxy methyl acrylamide, styrene, ethyl acrylate, and/or methacrylic acid.

4. The coating composition of claim 1, further comprising a film forming resin.

5. The coating composition of claim 4, wherein the film forming resin comprises an acrylic resin.

6. The coating composition of claim 4, further comprising a crosslinker.

7. The coating composition of claim 6, wherein the crosslinker comprises a phenolic resin.

8. The coating composition of claim 1, wherein the composition is substantially free of bisphenol A.

9. The coating composition of claim 1, wherein the coating is essentially free of bisphenol A.

10. The coating composition of claim 1, wherein the coating is completely free of bisphenol A.

11. The coating composition of claim 1, wherein the reaction product is a latex.

12. The coating composition of claim 1, wherein the coating composition is suitable for spray application.

13. The coating composition of claim 1, wherein the silicone comprising at least one ethylenically unsaturated group comprises a vinyl modified silicone.

14. An article coated at least in part with the coating composition of claim 1.

15. A package coated at least in part with the coating composition of claim 1.

16. The package of claim 15, wherein the package is a metal can.

17. The package of claim 16, wherein the metal can is a food can.

18. The package of claim 15, wherein the coating composition coats at least a portion of the inside of the package.

19. The package of claim 15, wherein the coating composition is spray applied onto the package.

* * * * *